(12) United States Patent
Sathish et al.

(10) Patent No.: US 9,076,009 B2
(45) Date of Patent: Jul. 7, 2015

(54) METHOD AND APPARATUS FOR SECURE SHARED PERSONAL MAP LAYER

(75) Inventors: Sailesh Kumar Sathish, Tampere (FI); Jilei Tian, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 142 days.

(21) Appl. No.: 13/816,118

(22) PCT Filed: Aug. 13, 2010

(86) PCT No.: PCT/CN2010/075988
§ 371 (c)(1),
(2), (4) Date: Jun. 3, 2013

(87) PCT Pub. No.: WO2012/019365
PCT Pub. Date: Feb. 16, 2012

(65) Prior Publication Data
US 2013/0254900 A1    Sep. 26, 2013

(51) Int. Cl.
G06F 21/62 (2013.01)
H04W 4/02 (2009.01)
H04W 4/18 (2009.01)
G06F 17/30 (2006.01)

(52) U.S. Cl.
CPC .................. *G06F 21/62* (2013.01); *H04W 4/02* (2013.01); *H04W 4/185* (2013.01); *G06F 17/30241* (2013.01)

(58) Field of Classification Search
USPC ............ 726/28, 2, 21, 36; 713/150, 163, 181; 380/255, 264, 276
See application file for complete search history.

(56) References Cited

U.S. PATENT DOCUMENTS

2008/0070593 A1*  3/2008  Altman et al. ................ 455/457
2009/0047972 A1*  2/2009  Neeraj ........................ 455/456.1
2010/0205242 A1   8/2010  Marchioro, II et al.

FOREIGN PATENT DOCUMENTS

CN         101133668 A      2/2008
CN         101346000 A      1/2009
CN         101346000 A      1/2009
WO   WO 2010006062 A1      8/2010

OTHER PUBLICATIONS

International Search Report for PCT/CN2010/075988 mailed May 19, 2011.
Chinese Office Action corresponding to Chinese Patent Application No. 201080068561.5, dated Dec. 25, 2014, with English-language summary; 12 pages.

* cited by examiner

*Primary Examiner* — Jaosn K. Gee
*Assistant Examiner* — Sharif E Ullah
(74) *Attorney, Agent, or Firm* — Ditthavong & Steiner, P.C.

(57) ABSTRACT

Techniques to provide a secure, shared personal map layer include determining a geographic location. The geographic location is associated with operation of a device. The techniques also include determining indication that describes a relationship between the geographic location and a first user of the device. The techniques also include determining a privacy level for the indication. Then, the first user of the device is associated with the indication and the geographic location and the privacy level. In some embodiments, the techniques also include determining a personal description vocabulary word based, at least in part, on the geographic location and a context for the device. Then it is determined to present on the device a prompt that includes the personal description vocabulary word.

19 Claims, 12 Drawing Sheets

METHOD AND APPARATUS FOR SECURE SHARED PERSONAL MAP LAYER

BACKGROUND

Service providers and device manufacturers (e.g., wireless, cellular, etc.) are continually challenged to deliver value and convenience to consumers by, for example, providing compelling network services. Widely popular network services include mapping services that provide services based on items indexed to a map, such as roads, railroad tracks, buildings, commercial establishments, rights of way, utilities, and public facilities such as parks. Example mapping services include direction and navigation services based on a user's known past, current or proposed future position, for example as input at a keyboard or deduced from a positioning system included in or otherwise co-located with a device of the user. Other example mapping services include information storage and retrieval based on locations, such as geographical information systems. Some mapping services allow a user to post comments about a location, such as reviews of a concert held at a particular venue or food served at a particular restaurant, to be viewed on a public network or within a social networking circle of contacts. The mapping services that can be provided however are limited by lack of information about the personal context of mapped items with respect to an individual user. For example, while the address of a particular building is known by the mapping service to be school, the fact that the building is the school of a child of a user is not typically known by the mapping server.

SOME EXAMPLE EMBODIMENTS

Therefore, there is a need for an approach to provide a personal map layer that indicates the personal context of one or more mapped items for each of one or more users. Some of this personal information should be shared, such as the user's office location, while other information, such as the location of a school of a child of the user should not be shared, or shared only with a very close circle of confidants. Thus there is a need for an approach for some combination of a secure shared personal map layer.

According to one embodiment, a method comprises determining a geographic location. The geographic location is associated with operation of a device. The method also comprises determining an indication, such as text, that describes a relationship between the geographic location and a first user of the device. The method further comprises determining a privacy level for the indication. Then, the first user of the device is associated with the indication and the geographic location and the privacy level.

According to another embodiment, an apparatus comprises at least one processor, and at least one memory including computer program code, the at least one memory and the computer program code configured to, with the at least one processor, cause, at least in part, the apparatus to determine a geographic location. The geographic location is indicated by operation of a second apparatus, which can be the same or a different apparatus. The apparatus is also caused to determine indication that describes a relationship between the geographic location and a first user of the second apparatus. The apparatus is further caused to determine a privacy level for the indication. The apparatus is also caused to associate the first user of the device with the indication and the geographic location and the privacy level, such as in a data structure.

According to another embodiment, a computer-readable storage medium carries one or more sequences of one or more instructions which, when executed by one or more processors, cause, at least in part, an apparatus to perform at least the steps of the above method.

According to another embodiment, an apparatus comprises at least means for performing steps of the above method.

According to another embodiment, a computer program product including one or more sequences of one or more instructions which, when executed by one or more processors, cause an apparatus to at least perform the steps of the above method.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program are disclosed for providing a secure shared personal map layer. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to map applications on a mobile terminal, it is contemplated that the approach described herein may be used with other user equipment and other applications, such as messaging applications and social networking applications.

Figure 1:
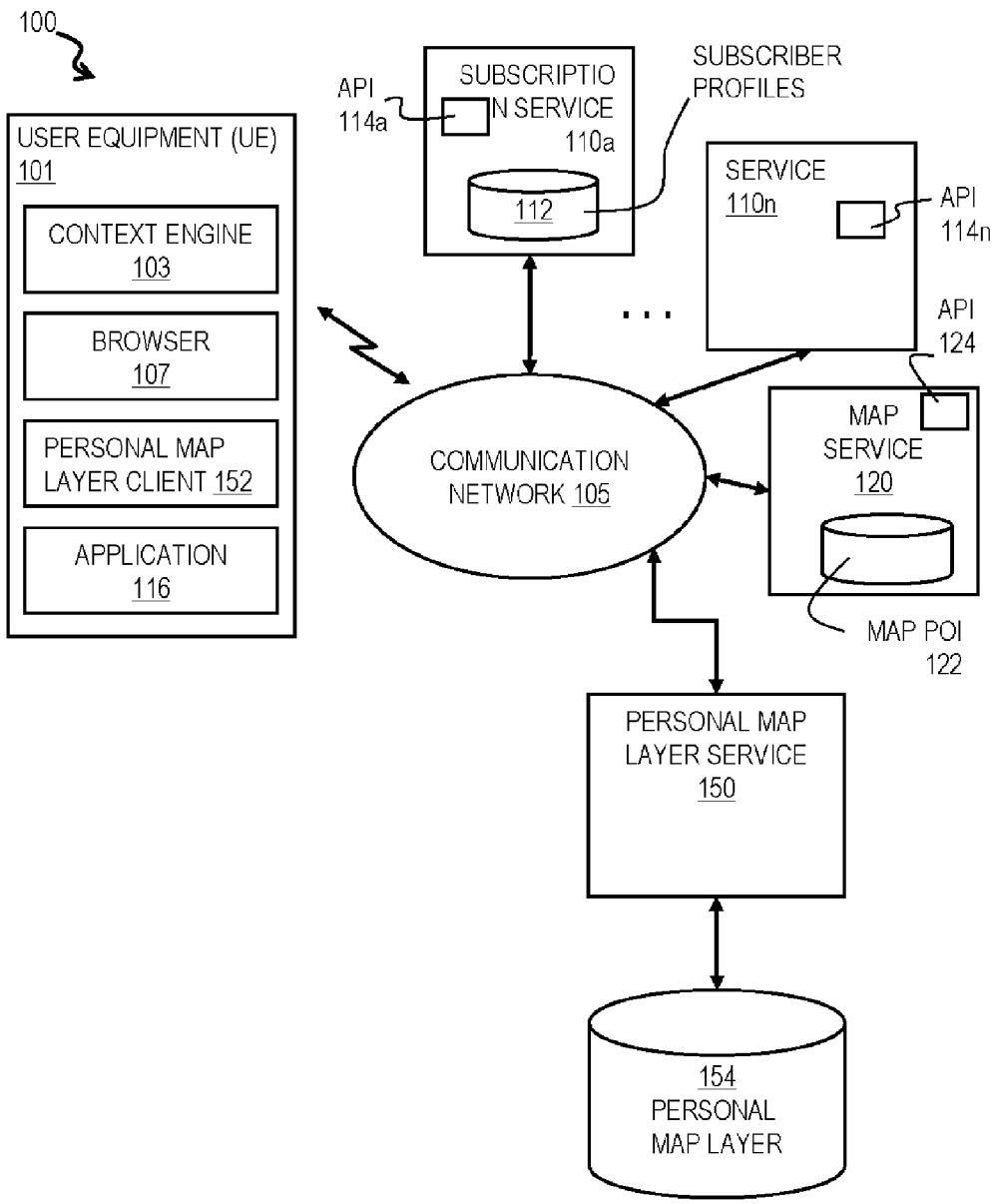
FIG. 1 is a diagram of a system capable of providing a secure shared personal map layer, according to one embodiment.

FIG. 1 is a diagram of a system 100 capable of providing a secure shared personal map layer, according to one embodiment. User equipment (UE) 101 is able to access one or more network services, such as subscription service 110a and service 110n among others as indicated by ellipsis (collectively referenced hereinafter as non-map network services 110) and one or more network map services 120 through a communications network 105. The subscription services typically include one or more subscriber profiles data structure 112 that hold information about the subscribers. For example, in a paid or free social networking subscription service, the subscriber profiles data structure 112 includes data that indicates information about the user, such as one or more credentials to identify the user (like a username and password), and one or more contacts of the user. One or more functions of the non-map services can be utilized through an application programming interface (API) such as API 114a and API 114n. APIs are well known and widely utilized in the art.

One or more map services 120 are available, such as a navigation directions service, a map presentation service, a commercial look-up service, or a geographical information systems (GIS) service, alone or in some combination. The map services 120 includes map items such as location data for boundaries such as shorelines and state and country borders, location data for rights of way such as roads and railroad tracks and ferries, or location data for points of interest (POI) such as parks and places of business and government buildings, or some combination, in one or more data structures, such as illustrated POI data structure 122. One or more of the network services, such as the non-map network services 110, may utilize the map services 120 through an API 124 for one or more map-related functions.

However, the map services 120 typically are unaware of one or more relationships between the map items in the one or more data structures and one or more users, such as a user of UE 101. Thus, for example, while the map services 120 includes data that indicates the locations of multiple banks in a region, the map services 120 are unaware of which bank is the personal bank and branch of the user of UE 101. Therefore, the user is inhibited from operating the UE 101 to indicate such simple concepts as: get directions to "my bank;" or lookup a telephone number of "my bank;" or send data indicating "my bank" to a contact of the user. Instead, the user is often forced to identify the bank to the map services 120 using objective identifiers, such as bank name and street name and city name and state name and country name, or some combination each time the user wishes to indicate the user's bank. This is wasteful of time and computational resources on the UE 101 or bandwidth on the communications network 105 or computational resources on a host of the map services 120, or some combination. In some services, the user can label or comment on a map item; however, the posting is public, at least to subscribers of a subscriptions service such as subscription service 110a. Thus the user is inhibited from labeling a bank as the user's own bank or bank branch to avoid exposing such confidential information to a large segment of the subscribers or to the general public.

To address this problem, a system 100 of FIG. 1 introduces the capability to provide a secure personal map layer. The system introduces a personal map layer client 152 on the UE 101 or a personal map layer service 150 on a remote device, or both, to securely determine map items to which the user of UE 101 has a personal relationship. The relationship is stored for future secure use in one or more data structures, such as personal map layer data structure 154. The personal map layer service 150 or client 152, or both, are further configured to allow the user to share the personal relationship information with the same or different services of one or more other users who have permission to share that personal relationship information. Furthermore, by relating a user's social network described by people ontology, and relating location with semantic representation, one can build highly intelligent system with wide knowledge through reasoning.

As shown in FIG. 1, the system 100 comprises user equipment (UE) 101 having connectivity to non-map network services 110, map services 120 and personal map layer (PML) service 150 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and network services 110, 120 and 150 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OST Reference Model.

Processes executing on various devices, often communicate using the client-server model of network communications, widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. Similarly, a client process can be downloaded and executed in small portions from a cloud of client portions distributed across the network 105. A well known client process available on most nodes connected to a communications network is a World Wide Web client (called a "web browser," or simply "browser") that interacts through messages formatted according to the hypertext transfer protocol (HTTP) with any of a large number of servers called World Wide Web (WWW) servers that provide web pages In the illustrated embodiment, the UE 101 includes a browser 107 and an application 116 and a context engine 103 in addition to the personal map layer client 152. The context engine 103 determines the local context of UE 101 and any user thereof, such as local time, geographic position from a positioning system, ambient temperature, pressures, sound and light, and applications currently executing on UE 101, content currently being rendered on UE 101, and user input through a user interface (UI), alone or in some combination. In some embodiments, the application 116 is a client for at least one of the network services 110 or 120. In some embodiments, application 116 is script delivered through the browser 107.

Although processes and data structures are depicted in FIG. 1 as integral blocks arranged on particular nodes connected to the communications network 105 for purposes of illustration, in other embodiments, one or more processes or data structures or portions thereof are arranged in a different order on the same or different nodes or data structures, including one or more databases, connected to the communications network 105. For example, in various other embodiments including cloud computing embodiments, one or more of the processes of the context engine 103, browser 107, personal map layer client 152 and application client 116, or portions thereof, execute in whole or in part on one or more nodes of the communications network 105 remote from the UE 101.

Figure 2A:
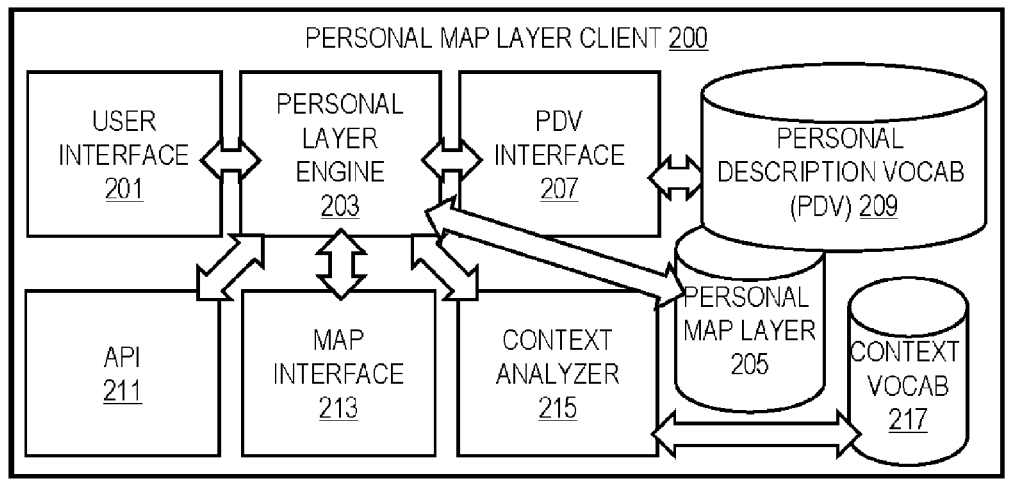
FIG. 2A is a diagram of components of a personal map layer client, according to one embodiment.

FIG. 2A is a diagram of components of a personal map layer client, 200 according to one embodiment. The PML client 200 is a particular embodiment of the PML client 152. By way of example, the PML client 200 includes one or more components for providing a secure, shared personal map layer. It is contemplated that the functions of these components may be combined in one or more components or performed by other components of equivalent functionality on the UE 101 or some other node connected to network 105. In this embodiment, the PML client 200 includes a user interface module 201, a personal layer engine 203 with a personal map layer (PML) data structure 205, a personal description vocabulary (PDV) interface module 207 with a personal description vocabulary (PDV) data structure 209, an API module 211, a map interface module 213, and a context analyzer module 215 with a context vocabulary data structure 217.

The user interface module 201 presents data, such as prompts, to a user of the device, such as UE 101. In some embodiments the user interface module 201 is a generator of HTML statements and forms that are presented to the user through browser 107. In some embodiments the user interface module 201 interacts with a user interface of another application on the UE 101, such as a user interface of application 116. In some embodiments, the UI module 201 operates on a portion of the user interface though an operating system on the UE 101.

The personal layer engine (PLE) 203 controls information from various sources to build, maintain and use the personal map layer (PML) data structure 205 that is described in more detail below with reference to FIG. 3B. The PML associates a map item, such as coordinates of a position or a path of multiple positions or a point of interest (POI), with a description determined by a user, e.g., a user of UE 101.

In some embodiments, the PLE 203 also uses the PML data structure 205 to associate a privacy level with the user determined description. For example, the PLE 203 first creates different layers varying in details of user determined description (e.g., based on the personal description vocabulary, PDV, described below) and associates a privacy level that indicates one or more classes of information obfuscation. The top privacy level describes a general overview of user personal space such as s "My Home", "My Office" etc while the next layer would contain more confidential information such as "My Child's School", "My Hospital", "My Shopping Area", "My Wife's favorite restaurant", "My Parent's House" etc. Since there are semantics attached to the PDV descriptions, the PLE 203 can associate a more confidential privacy level with certain highly personal contacts. For example, a most confidential privacy level is associated automatically with the PDV contact terms "My Wife" and "My Daughter" compared to other confidential privacy levels associated automatically with other contacts, such as "My Colleague." In some embodiments, the privacy level is associated with a circle of contacts in a social networking service. The different privacy levels are useful to preserve privacy when PML information is shared among different users and different applications.

In the illustrated embodiment, the PML data structure 205 is a common data store local to the device. The data store can synchronize itself based on user account information with a remote PML service 150 with the remote PML data structure 154. Having a common store also allows other applications to access the data and use it (with user permission).

The PDV interface module 207 utilizes information in the personal description vocabulary (PDV) data structure 209 that is described in more detail below with reference to FIG. 3A. The PDV data structure 209 contains descriptions of map items in user understandable and personal vocabulary. For example, a hospital can have an entry in PDV as "My nearby hospital". In some embodiments, the proper vocabulary terms to present in association with a map location are inferred based on a primary inference, such as the location of the user's home, after that primary reference location is determined. Once a description has been obtained from the PDV data structure 209 by the PDV interface 207, the description is then shown to the user through the UI interface 201. The user can select one of the suggested descriptions for that place such as My nearby Hospital, My work place, My home, My shopping area, My child's school etc. Alternatively, or in addition, the user can also provide a self description, such as adding "for my father-in-law" to the PDV for "My nearby hospital." Using the system provided terms of the PDV also helps with attaching semantic meaning to those descriptions as is understood by the system. This helps in tying together descriptions in personal map layers for multiple users or multiple applications or both. The PDV also includes terms for persons in the user's contacts lists (with attached semantics) like "My Father", "My Wife", "My Daughter", "My Work Colleague" etc.

The API module 211 processes information requests from other processes on the same UE 101 or other device in communication with the communications network 105. The map interface module 213 interacts with one or more map services 120, e.g., by exchanging messages with the map services API 124.

The context analyzer 215 interacts with the context engine 103 to obtain the context at the UE 101 and expresses the context using the context vocabulary in the context vocabulary data structure 217. In various embodiments, a context vocabulary is developed that identifies words and topics related to consumers' contexts. Any method known in the art may be used to generate the context vocabulary and topology. In some embodiments, context vocabulary is defined based on output from the context engine 103, which reflects all context that can be inferred from the device side, such as user location, current activity, transport mode (in car, in bus, driving etc), relations (social contacts). For example, based on spatial inferences, such as determining user positions where concentration of user movements have been observed, the analyzer retrieves data from map POT data structure 122. In some embodiments, call logs or social network services are mined for context information. For example, based on call logs, certain social relations that exist between the user and some contacts in the user contact list can be determined. For example, the user can be prompted through the user interface module 201 to annotate certain people in the contact database based on terms in the PDV like "My Father," etc. Similarly, based on dwell times, certain relations that exist between the subscriber and some locations can be determined, such as a particular frequent, overnight-stay location has a certain probability of being the subscriber's home.

Figure 2B:
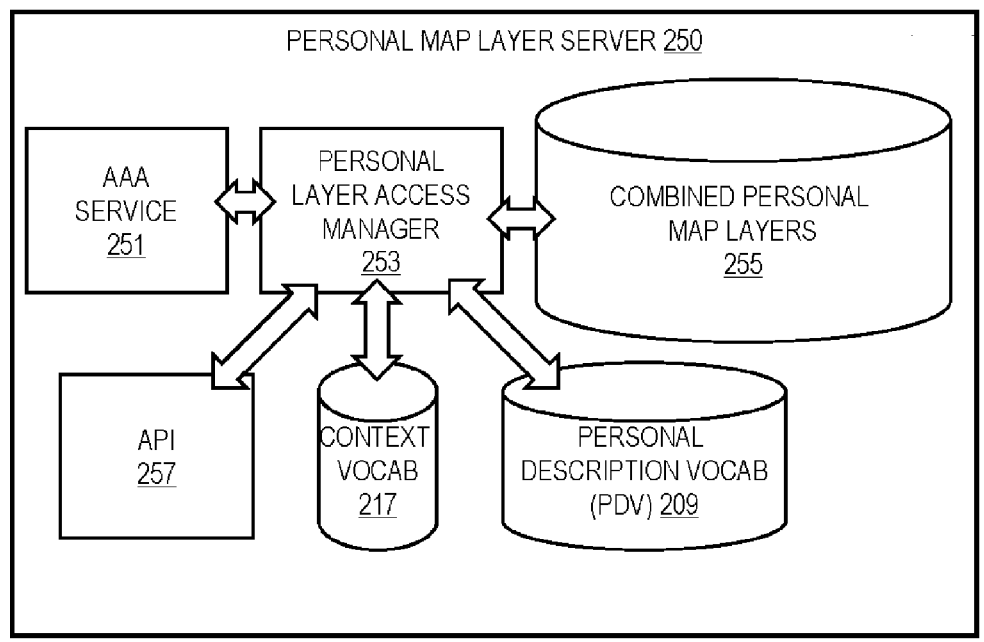
FIG. 2B is a diagram of components of a personal map layer server, according to one embodiment.

FIG. 2B is a diagram of components of a personal map layer server 250, according to one embodiment. The PML server 250 is an example embodiment of PML service 150. By way of example, the PML server 250 includes one or more components for providing a secure, shared personal map layer. It is contemplated that the functions of these components may be combined in one or more components or performed by other components of equivalent functionality on the host of server 150 or some other node connected to network 105. In this embodiment, the PML server 250 includes an authentication, authorization and accounting (AAA) service 251, a personal layer access manager module 253 that maintains a combined personal map layers data structure 255, and an API 257. The illustrated embodiment of PML server 250 also includes the context vocabulary data structure 217 and PDV data structure 209 described above for the PML client 200.

The AAA service 251 is used to identify a user to determine whether that user is permitted to view the personal map layer of another user. Any AAA service known in the art may be used. In an illustrated embodiment, a subscription service 110a, such as a social networking service, is used to identify a user. For example, user credentials, such as a username and password are passed to the subscription service API 114a and a results message is received indicating whether that user is authenticated, i.e., whether that user really is the entity indicated. Similarly, in some embodiments, permission levels of other users are determined from the AAA service 251, such as the contacts of the user in various circles of friends of the social networking service.

The personal layer access manager 253 controls the interaction among various components of the PML server 250. For example, the personal layer access manager 253 adds and retrieves entries for the personal map layer to the combined PML data structure 255, identifies a user and a requestor using the AAA service 251, and provides the PML client 200 and context vocabulary data structure 217 and PDV data structure 209 to the UE 101. The functions of the personal layer access manager 253 are accessed by other applications, such as other network services 110, through the API module 257.

The personal map layer data of multiple users are put into a common data store. The combined PML data structure 255 holds entries for the PMLs of multiple users, so that the PML information can be shared across multiple applications and network services.

The API module 257 processes information requests from other processes on the same UE 101 or other device in communication with the communications network 105, such as other user devices and other network services 110 or map service 120.

Figure 3A:
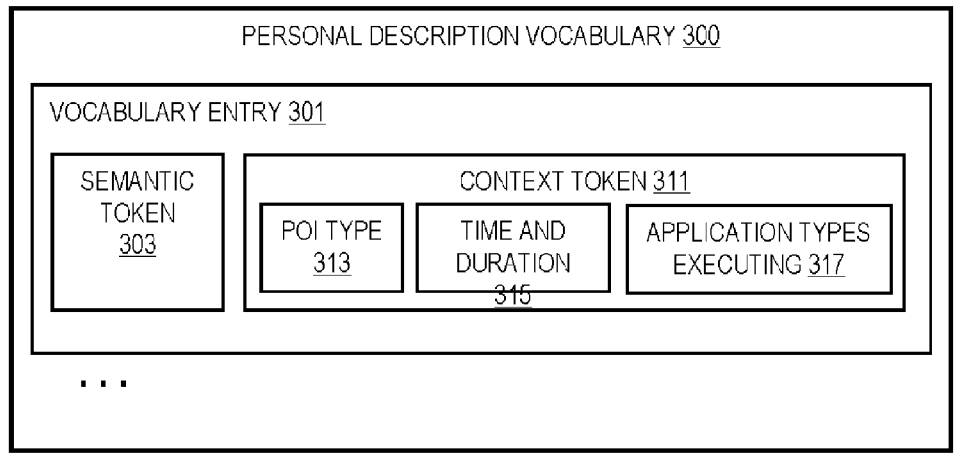
FIG. 3A is a diagram of a personal description vocabulary data structure, according to one embodiment.

FIG. 3A is a diagram of a personal description vocabulary data structure 300, according to one embodiment. While data structures, fields and messages are depicted in FIG. 3A, FIG. 3B and FIG. 3C as integral blocks arranged in a particular order for purposes of illustration, in other embodiments, one or more data structures or fields or messages, or portions thereof, are split over several messages or over several data structures or databases on one or more nodes connected to the network 105, or some combination.

The PDV data structure 300 comprises one or more vocabulary entries such as vocabulary entry 301 and others indicated ellipsis. Each vocabulary entry 301 includes a semantic token field 303 and a context token field 311.

The semantic token field 303 holds data that represents a standard language concept useful for labeling locations in mapping applications. As used herein a token is a data structure that is capable of holding the desired information, such as a vector of semantic concepts. For example, in some embodiments, the standard labels include such terms as home, work, school, bank, food store, restaurant, clothing store. In some embodiments, the concepts include personal relationships, such as myself, spouse, friend, colleague, acquaintance relative, in-law, mother, father, parent, child, daughter, son, etc. Such semantic tokens are well known in the art and, in some embodiments, include hierarchical relationships among concepts. For example a relative concept is at a high level of the hierarchy and encompasses concepts such as parent, child, uncle, aunt, sibling, cousin, etc. One or more of these in turn encompasses one or more other concepts at lower levels of the hierarchy. For example, child concept includes son, daughter, grandson, granddaughter etc. Similarly, the map concepts can also be hierarchical in some embodiments. For example, the bank concept encompasses bank branch concept. In some embodiments, each token includes synonyms for the concept (such as one the terms "store" and "shop" for the same concept), including words in different languages that represent the same concept.

The context token field 311 holds data that indicates a context associated with the semantic token. Context includes location, nearby points of interest, time and duration of stay, and applications in process on the UE 101. Context token 311 is used to suggest one or more semantic token labels for a map item to a user. For example, the "home" concept is associated with residential addresses and overnight times on most days of the month or year and such applications as games and videos. The concept "work" is associated with non-residential and non-recreational locations, business hours on weekdays, and applications such as email and telephone calls to work colleagues or word processors or spreadsheets. A context token is an array of values corresponding to context parameters. Accordingly, in the illustrated embodiment, the context token field 311 includes a map point of interest (POI) type field 313, a time and duration field 315, and an application types executing field 317.

The POI type field 313 holds data that indicates the types of map POIs that are at or near the location that is labeled as in the semantic token field 303, such as shopping center, park, train terminal, etc. For semantic tokens related to personal relationships, such as myself, mother, father etc., the POI type field may be empty. The time and duration field 315 holds data that indicates what days of year or day of week or durations or number of occurrences are associated with the label in the semantic token field 303. The application types executing field 317 holds data that indicates types of applications (such as email, voice call, text, video, audio, game, social network website, news website, word processors and spreadsheets, among others) are associated with the label in the semantic token field 303. In some embodiments, the application types executing field 317 also includes data that indicates the circle of friends in a social network service which is associated with the label.

Figure 3B:
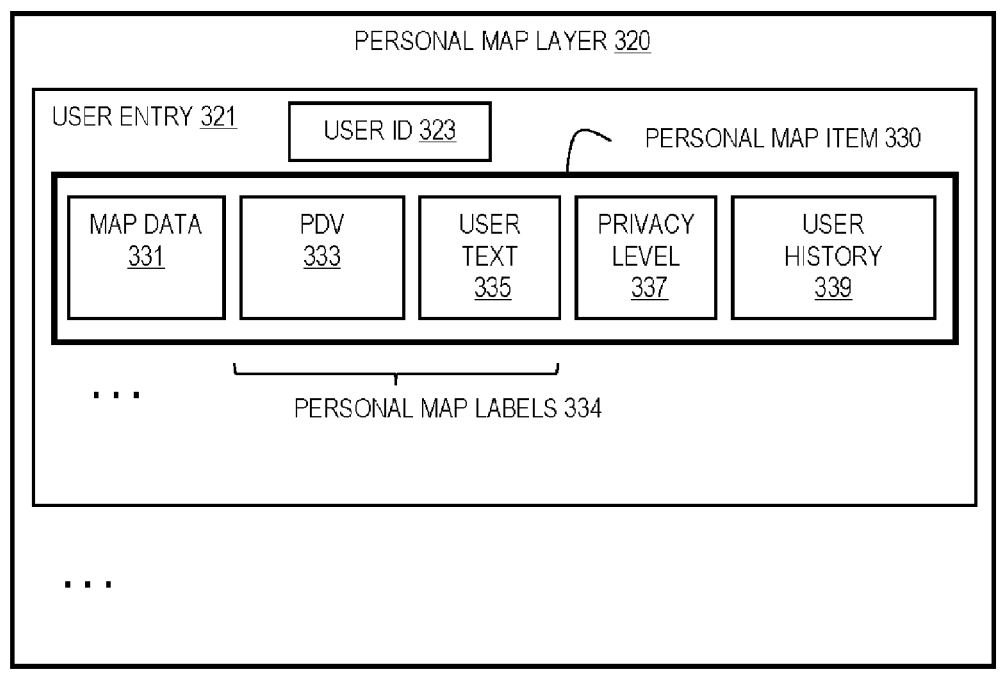
FIG. 3B is a diagram of a personal map layer data structure, according to one embodiment.
Figure 3C:
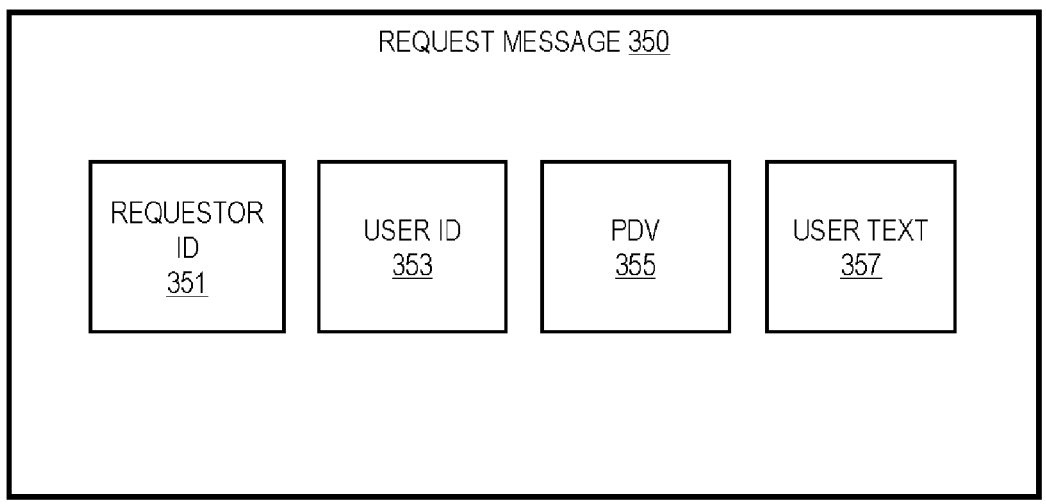
FIG. 3C is a diagram of a personal map layer request message, according to one embodiment.

FIG. 3B is a diagram of a personal map layer data structure 320, according to one embodiment. The PML data structure 320 comprises one or more user entries such as user entry 321 and others indicated by ellipsis. Each user entry 321 includes a user identifier (ID) field 323, and one or more personal map item fields 330 and others indicated by ellipsis, collectively referenced hereinafter as personal map item fields 330.

Each personal map item field 330 includes a map data field 331, a PDV field 333, a user text field 335, a privacy level field 337 and a user history field 339. At various times one or more of the fields of a personal map item field 330 may be empty or omitted.

The map data field 331 hold data that indicates a map feature in the map service 120, such as a location, a path of multiple locations (e.g. a route from home to work), or a POT identifier (ID).

The PDV field 333 holds data that indicates one of the personal description vocabulary terms, such as a semantic token 303 from the PDV 300. The PDV field 333 is an example means of achieving the advantage of using a standard vocabulary to label a personal map item, so that applications can retrieve map information based on the standard vocabulary, such as home, work or school of a particular user. The user text field 335 holds text provided by a user in response to a prompt, as described in more detail below. The text field 335 is an example means to achieve the advantage of tailoring a label to the specific desires of a user. Together, the data in the PDV field 333 and the user text field 335 constitute a personal map label field 334. The personal map label fields 334 are an example means to achieve the advantage of allowing a user or contact of the user to identify a map item by its relationship to the user or contact. Thus a user can refer to the home of another user (e.g., a contact) without knowing more about the location of the home.

The privacy level field 337 holds data that indicates a privacy level. Any privacy scale may be used. For example, a privacy level 1 indicates only the user may retrieve the data associated with the personal map item 330, a level 2 indicates that an immediate family member (parent, spouse, child) may retrieve the information, a level 3 indicates any family member, a level 4 indicates any friend in a social network service, a level 5 indicates any contact in a telephone or email log, and a level 6 indicates the general public. In some embodiments, a default level, e.g., level 3 is assumed for any personal map item 330, unless overridden by the user identified in user ID field 323, e.g., using a user interface described below with reference to FIG. 5B. A privacy level N allows all persons associated with privacy levels from 1 to N to access the associated personal map item 330. The privacy level field 337 is an example means of achieving the advantage of sharing personal map layer information securely.

The user history field 339 holds data that indicates the user context when the user was at the location indicated by the map data field 331, including the time, duration, frequency, and applications running. This information helps the system to recommend a PDV label based on the user history when the user is prompted to provide information for field 333 and field 335, as described below with reference to FIG. 4. Thus the user history field 339 and the context token field 311 are example means to provide the advantage of suggesting a PDV label to a user when prompting the user for a personal map label 334 to associate with map data 331. In some embodiments, the user history field 339 holds data that indicates one or more context tokens 311 that describe the user or UE context when at, or in the vicinity of, the map item indicated in field 331.

Thus the user entry field 321 associates the first user of the device identified in field 323 with the text and the geographic location and the privacy level included in the personal map item field 330. The user entry field 321 is an example means of achieving the advantaging of associating a personal map layer with one or more locations or POIs or paths of a mapping service.

FIG. 3C is a diagram of a personal map layer request message 350, according to one embodiment. The message 350 includes a requestor identifier (ID) field, a user ID field 353, a PDV field 355 and a user text field 357. Depending on the type of the request, one or more of the fields of request message 350 may be empty or omitted. The requestor ID field 351 holds data that indicates an entity known to the AAA service 251, including any credentials useful for authenticating the entity, such as username and password of a subscriber to subscription service 110a.

The user ID field 353 holds data that indicates a user whose PML data structure 205 (or 255) is to be examined. In some embodiments, fields 351 and 353 support a request for a list of all the labels in the PML for the user identified in field 353. A list is provided based on the permission level of the requestor and the privacy level of the personal map item. Based on the list, one of the labeled map items may be selected and requested by its label using fields 355 or 357 or both.

PDV field 355 and user text field 357 hold data that indicates a particular personal map label 334 that is being requested. The map data associated with that label is returned to the requestor, if the requestor has permission to view personal map items of the privacy level of the requested map item.

Figure 4:
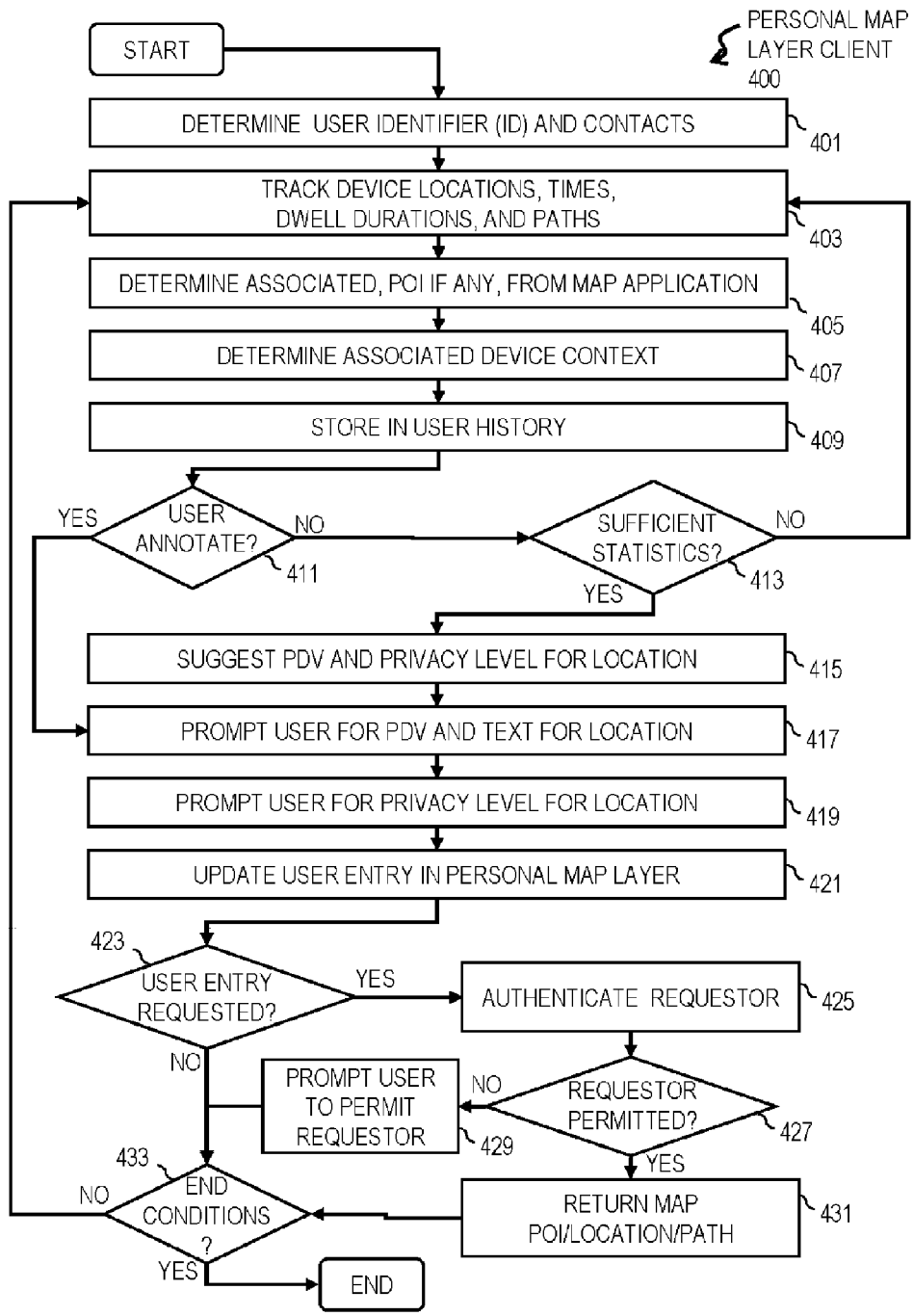
FIG. 4 is a flowchart of a process for a personal map layer client process, according to one embodiment.
Figure 9:
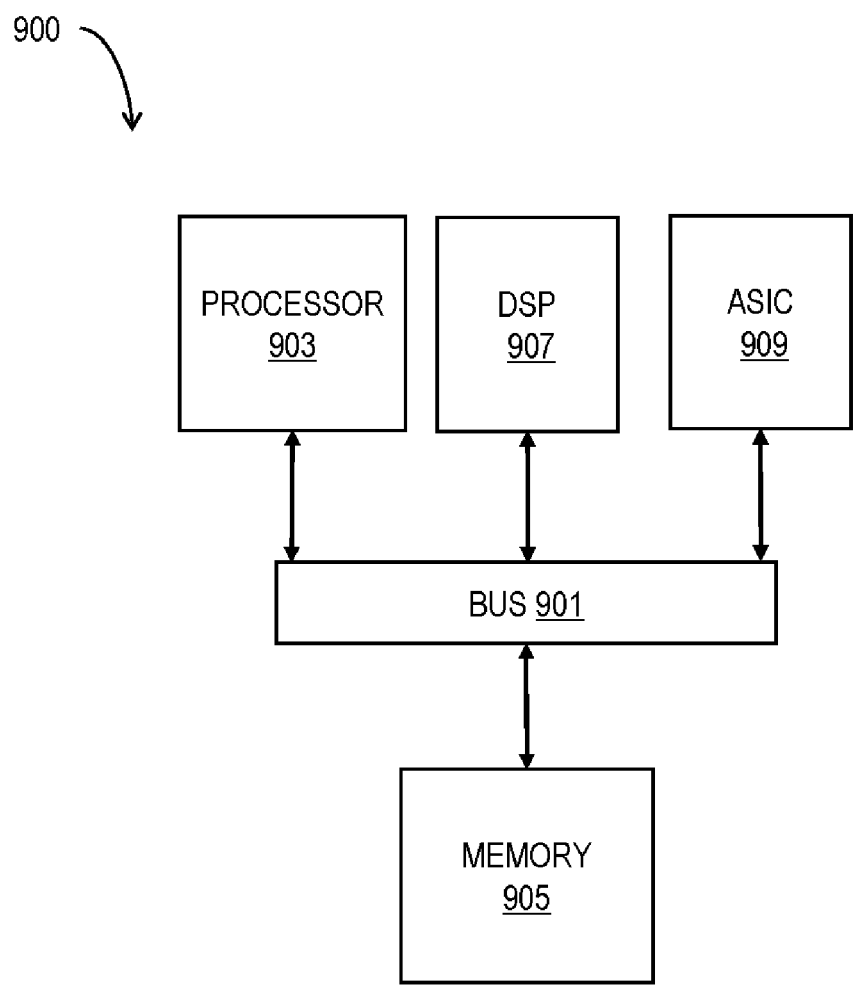
FIG. 9 is a diagram of a chip set that can be used to implement an embodiment of the invention.
Figure 10:
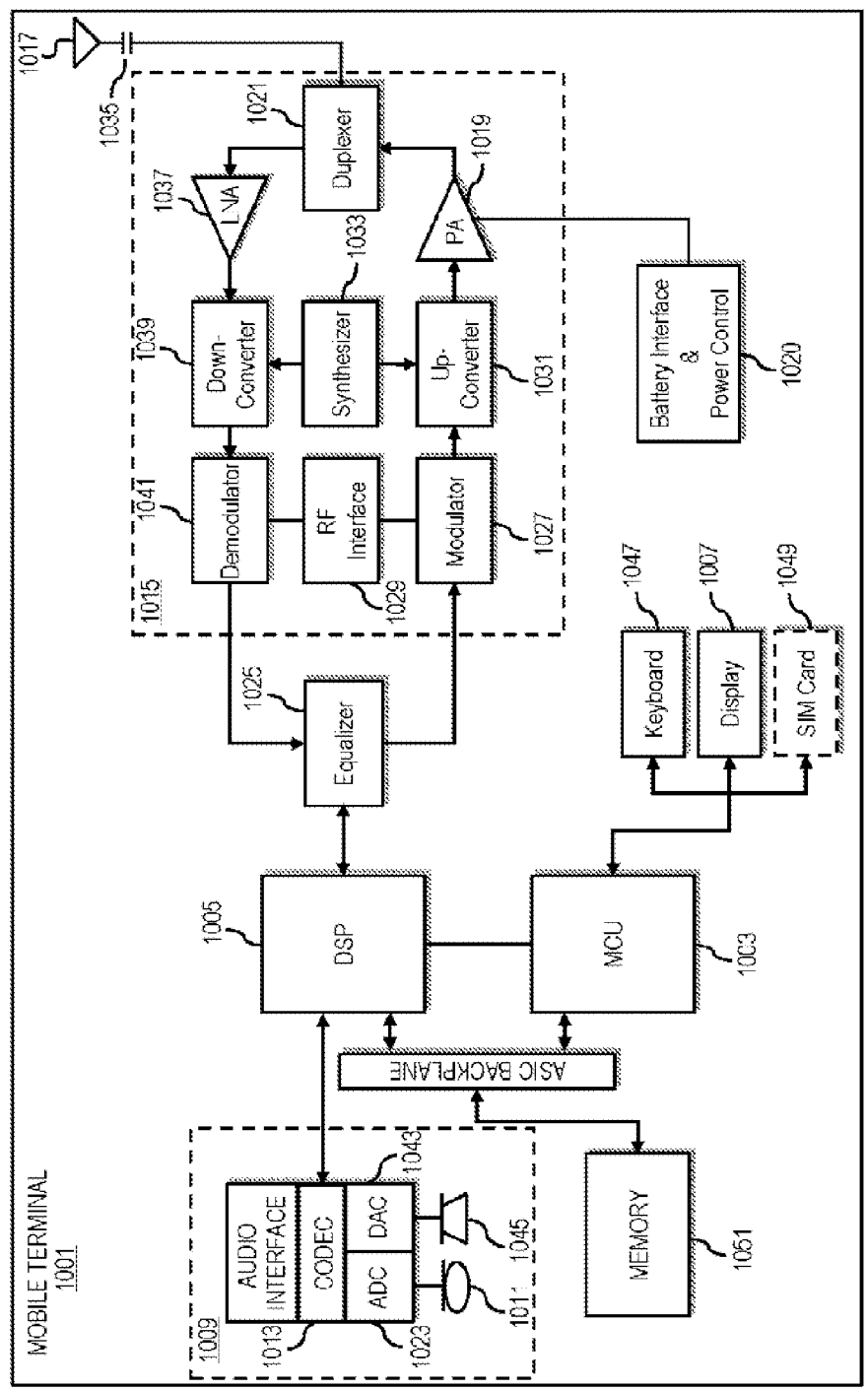
FIG. 10 is a diagram of a mobile terminal (e.g., handset) that can be used to implement an embodiment of the invention.

FIG. 4 is a flowchart of a process 400 for a personal map layer client process, according to one embodiment. In one embodiment, the personal layer engine 203 of the personal map layer client 200 performs the process 400 and is implemented in, for instance, a chip set including a processor and a memory as shown in FIG. 9 or on a mobile terminal as depicted in FIG. 10. In some embodiments, one or more steps or portions thereof are performed by other components of the client 200 or by nodes in communication with network 105. Although steps are depicted in FIG. 4 and in FIG. 6 as integral blocks in a particular order for purposes of illustration, in other embodiments, one or more steps, or portions thereof, are performed in a different order, or overlapping in time, in series or in parallel, or one or more steps or portions thereof are omitted, or one or more steps are added, or the method is changed in some combination of ways.

In step 401, the user identification (ID) and user contacts are determined. Any method may be used to determine the user ID and user contacts. For example, in some embodiments, the user is prompted for this information and the user responses are recorded. In some embodiments, the user ID or contacts or both are provided by a remote service, either in response to a query or unsolicited. In some embodiments, the personal map layer client 152 is installed from the personal map layer service 150 in response to a command by a subscription service 110a that provides the user ID and contacts from subscriber profiles data structure 112. In some embodiments, the client 152 monitors the user activity on UE 101 and detects logon at a social networking service, such as subscription service 110a In response to detecting the logon, the client 152 records the user ID for the social networking service, and any credentials used. The client 152 then requests the user's contacts from the social networking service through the API 114, either directly, or indirectly through the personal map layer service 150. In some embodiments, the user is prompted to associates the contacts with a relationship semantic token, such as mother, brother, daughter, spouse, colleague, classmate, etc.

In step 403, the device locations, times, dwell durations and paths are determined. For example, a user types a location address or coordinates and associated time or duration. In some embodiments, a global positioning system co-located near or within the UE 101 is tracked to determine position history. Thus, determining the geographic location indicated by operation of the device further comprises determining the time and duration of pausing in a vicinity of the geographic location based on a positioning system co-located with the device. In some embodiments, the context engine performs some or all of step 403. In some embodiments, the PML client 152 polls the context engine 103 for current position and derives dwell times and paths from the returned positions and the current time. In some embodiments, step 403 includes deducing home context or office context for a position based on duration and timing of dwell times. A dwell time is a time interval during which the UE 101 is relatively stationary, e.g., moving less than about 100 meters for more than a few minutes. An average position during the dwell time is called a dwell position. Thus step 403 includes determining a geographic location indicated by operation of a device (e.g., UE 101).

In step 405, a POI associated with a position during a dwell time, if any, is determined, e.g., by sending a query with the dwell position to the map service 120.

In step 407, the rest of the context for the user device is determined, e.g., by requesting a context token from the context engine 103. Step 407 includes determining the applications currently executing on the user device (e.g., UE 101) and contacts currently in communication with the user through the user device. In step 409, some or all of the context token is stored in the user history field 339 of the PML.

In step 411, it is determined whether the user is annotating a position. For example, it is determined whether the user has selected a position on a display provided by a map service and indicated through a user interface that a label is to be attached, as described in more detail below with reference to FIG. 5A and FIG. 5B. If so, then in step 417 the user is prompted to label the location with a PDV term and subjective text, as described in more detail below. If not, then in step 413, it is determined if sufficient statistics have been accumulated in user history to deduce a location of apparent interest to the user. For example, after a month of spending evenings in predominately one place and workdays in predominately another, the two places are likely home and work and the user should be prompted to label them if not already labeled, so control passes to step 415. If sufficient statistics are not available, e.g., during the first two weeks of operating the user device (e.g., UE 101), when the user might be on vacation, control passes back to step 403 and following steps to continue to track the device positions and associated contexts.

Figure 5A:
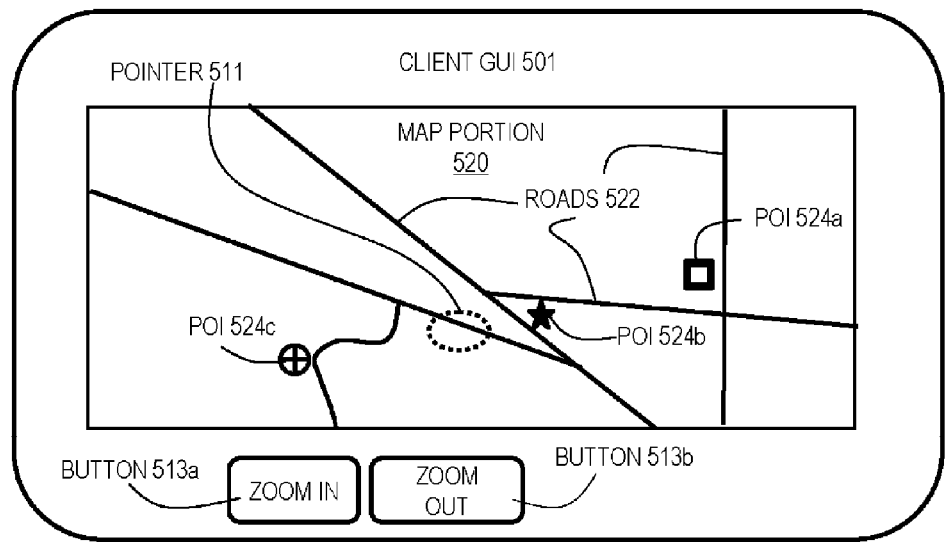
FIGS. 5A-5D are diagrams of user interfaces utilized in the processes of FIG. 4, according to various embodiments.

FIGS. 5A-5D are diagrams of user interfaces utilized in the processes of FIG. 4, according to various embodiments. FIG. 5A is a diagram that illustrates a client graphical user interface (GUI) 501 for a map application, e.g., application 116 on UE 101 or browser 107 interacting with map service 120, according to an embodiment. The GUI 501 includes one or more active areas in which a user selection is detected to determine user input, as is well known in the art. For example, user input is determined based on positioning a pointing device, such as a controller for a cursor and a key to indicate a selection, or a touch screen. The GUI 501 includes a map portion area 520 that presents a portion of a map. The map portion includes roads 522, points of interest (POI) 534a, 524b, 524c, among others, collectively referenced hereinafter as POI 524. A pointer 511 indicates a selected position in the map portion area 520. The GUI also includes buttons 513a and 513b (collectively referenced hereinafter as buttons 513) that are active areas that perform a particular function indicated by a button label upon selection by a user. For example, in response to detecting a touch on button 513a, the map portion in the map area is zoomed in to expand distances. Similarly, in response to detecting a touch on button 513b, the map portion in the map area is zoomed out to shrink distances.

In step 415, a PDV and privacy level are suggested for one or more positions of apparent interest deduced from the user history. For example, based on a month of tracking position and other context information, it is deduced that location A is a home or dormitory of the user, position B is a workplace or library, and position C is a school of the user's child or sibling, and positions D, E and F are shopping centers for the user. A privacy level is based on default rules, such as a level of 5 for the user's home and work, 4 for the shopping centers, and 3 for the school. Thus, step 415 includes determining a personal description vocabulary (PDV) term based, at least in part, on the geographic location and a context for the device. Alternatively or in addition, step 415 includes determining a personal description vocabulary word based, at least in part, on a type of a point of interest associated with the geographic location in a mapping database.

In step 417, the user is prompted to label the selected one or more positions. The one or more positions are selected by the user in step 411, e.g., by touching the map portion area 520 at the position of pointer 511, or by the system based on statistics of user history in step 413. For example, a user interface is presented that depicts a map section with one or more selected positions highlighted. The user is presented with a pull down menu of the PDV terms, either the entire list or a portion considered relevant based on the suggestions determined in step 415. Thus step 417 includes determining to present the personal description vocabulary term. In step 419, the user is prompted for a privacy level, e.g. by confirming or overriding the automatically suggested default privacy level. For example, the user is presented with the GUI of FIG. 5B.

Figure 5B:
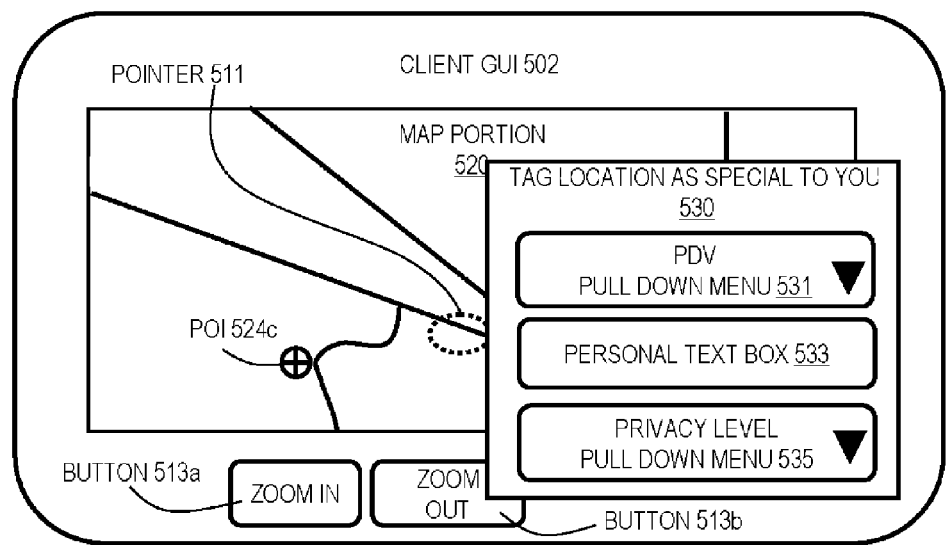

FIG. 5B is a diagram that illustrates a client graphical user interface (GUI) 502 for labeling a selected position, according to an embodiment. The GUI 502 includes the map portion area 520 and button 513 as described above. The selected position is indicated in map portion area 520 by pointer 511. As stated above, the selected position is selected directly by the user in step 411 or suggested by the PML client 152 based on user history in step 415. The user is prompted to label the selected position by presenting the window 530 that includes text prompting the user to label the position for the personal map layer. For example, in the illustrated embodiment, the text in window 530 recites the words "tag location as special to you." The window 530 is presented in any manner known in the art. For example, window 530 is presented by the user interface module 201 through the application 116, the browser 107 or directly using the UE operating system, or some combination.

The window 530 includes a PDV pull down menu 531, a personal text box 533 and a privacy level pull down menu. Pull down menus are active areas that are well known in the art of graphical user interfaces. The PDV pull down menu will include at least the suggested PDV terms determined in step 415, or a more complete set if step 415 is skipped. For example, by selecting the downward pointing triangle, a list of PDV terms is presented to the user, such as some or all of: my home, relative home, friend home, my work, relative work, friend work, my hospital, relative hospital, friend hospital, my school, relative school, friend school, my shopping center, relative shopping center, friend shopping center, my bank, relative bank, friend bank, among others. These terms may be ordered along levels of probability determined by the context engine. In some embodiments, after making a selection form the PDV pull down menu, a secondary menu is presented, e.g., to identify the friend or relative. Depending on user history and contact lists determined in step 401, e.g., contact abc123=mother or alice246=child, the secondary PDV terms may be more specific, e.g., mother home, brother home, parents-in-law home etc, child hospital, child school, in response to selecting relative home. Thus active area 531 is an example means to achieve the advantage of providing a personalized standard recognized semantic concept to a map location The user is prompted to add subjective text in the personal text box 533. For example, a location labeled "mother home" using the PDV terms can be further characterized by user text as "city condominium" or some other more specific and subjective description. Thus active area 533 is an example means to achieve the advantage of providing a personalized subjective label to a map location. Thus step 417 includes determining text that describes a relationship between the geographic location and a first user of the device. The text is some combination of the PDV and the subjective text. Step 417 includes determining the text by determining to present a prompt that solicits the text from the first user (user of UE 101).

In step 419, the user is prompted to indicate the privacy level using the privacy level pull down menu 535. For example, the privacy level is shown as the default, e.g., Family (level 3) but the pull down menu makes the other options available: Your Eyes Only (level 1), Immediate Family (level 2), Friends (level 4), Contacts (level 5) or Public (level 6). Thus active area 535 is example means to achieve the advantage of providing a secure method of sharing personal map information. Step 419 thus includes determining a privacy level for the text. In some embodiments, the privacy level presented in the prompt is based on the location and context, e.g., school or shopping center at certain times of the day. Thus determining the privacy level further comprises determining a suggested privacy level based on the geographic location and a context for the device. In the illustrated embodiment, determining the privacy level further comprises determining to present the suggested privacy level in the prompt, e.g., in active area 535.

In step 421, the user entry is updated in the personal map layer data structure 205 based on the user responses to the prompts. For example, the user entry field 321 for the user is updated with a new personal map item field 330; or an extant personal map item field 330 is updated. In some embodiments, step 421 includes sending the update, alone or in combination with one or more other updates, to the PML server 250 to add to the combined PML data structure 255. Thus step 421 includes associating the first user of the device with the text and the geographic location and the privacy level. Furthermore, in the illustrated embodiment, associating the first user of the device with the text and the geographic location and the privacy level is based at least in part on a response received in response to presenting the prompt. Since the field 330 includes the PDV term in field 333, at least in some embodiments, associating the first user with the text and the geographic location and the privacy level based on the response further comprises associating the first user and the text and the geographic location and the privacy level with the personal description vocabulary (PDV) term. Step 421 includes determining to store the association of the first user with the text and the geographic location and the privacy level into a common data structure (either PML 205 or combined PML 255) for access by a plurality of user device.

Figure 5C:
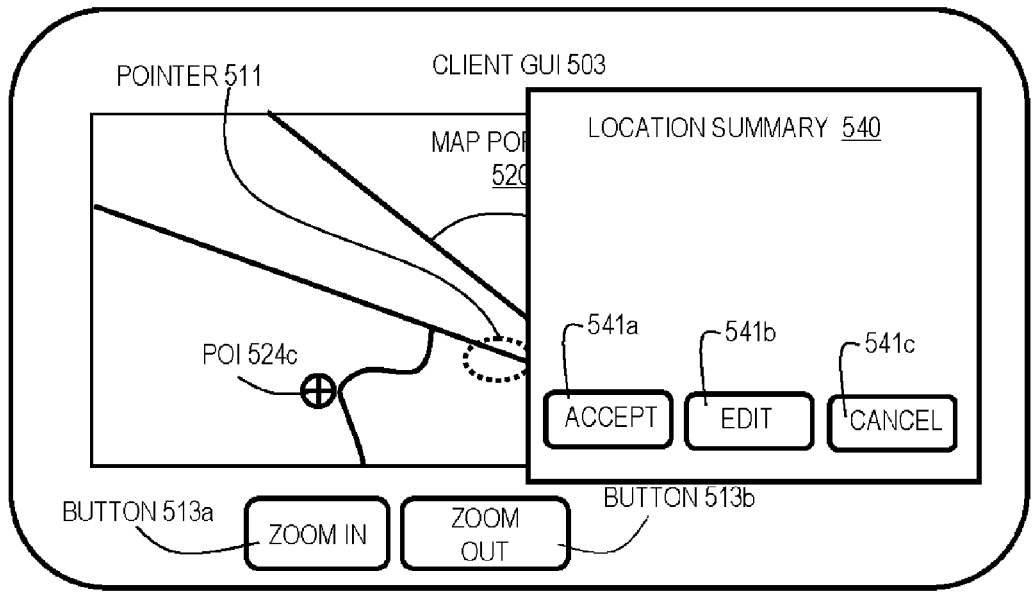

For example, to update the PML, the user is presented with the GUI depicted in FIG. 5C. FIG. 5C is a diagram that illustrates a client graphical user interface (GUI) 503 for labeling a selected position, according to an embodiment. The GUI 503 includes the map portion area 520 and buttons 513 as described above. The selected position is indicated in map portion area 520 by pointer 511. As stated above, the selected position is selected directly by the user in step 411 or suggested by the PML client 152 based on user history in step 415. The user is prompted to accept, edit or cancel the label privacy level for the selected position by presenting the location summary window 540. Window 540 is presented through the client user interface module 201, as described above. Window 540 includes text presenting the current labels and privacy level for the selected position. Window 540 also includes three active areas to accept, edit or cancel the label and level for the selected position, e.g., as buttons 541a, 541b and 541c, respectively. Upon activation of the cancel button 541c, the window 540 is closed and the position label is not updated. Upon activation of the edit button 541b, window 540 is closed and window 530 is reopened to allow the label and level to be changed. Upon activation of the accept button 541a, window 540 is closed and the user entry is updated in the PML data structure, such as data structures 205 or 255 or both.

The above steps are related to the formation of the PML. The following steps are related to using the PML in one or more applications, including one or more non-map applications.

In step 423 a request is received for a user entry field from the user's PML. For example, a request is received from a messaging application 116 on the UE 101, or from an application on a different user device, for one or more personal map items from the PML data structure 205. For example, a request message 350 is received from a messaging application 116 on the UE 101, or from an application on a different user device, or from a network service 110 or map service 120, for one or more personal map items from the PML data structure 205. The request message 350 identifies the requestor in the requestor ID field 351, such as a source field in an Internet Protocol header. The request message 350 identifies the user in the user ID field 353. Thus, the request indicates the first user of UE 101. If the PDV field 355 and user text field 357 are blank, the request 350 is for a list of the labels for personal map items the requestor is permitted to see. Based on selecting one or more items from that list, a subsequent request message 350 indicates the PDV and user text of the label in fields 355 and 357, respectively. Thus, in some embodiments, the request indicates the text; and in some embodiments, the request indicates a personal description vocabulary term associated with the text. Thus, step 423 includes receiving a request for an association between the text and the geographic location for the first user.

If such a request message is received, then in step 425 the requesting entity is authenticated. For example, credentials for the requestor are sent to the AAA service 251, e.g., by sending a message to the PML server 250 or though the PML server API 257. In step 427, it is determined whether the requestor is permitted access to the requested personal map items of the user in fields 330. For example, it is determined whether the requestor is a contact labeled as the user, the immediate family, family, friend, other contact or not labeled (hence a member of the general public) and the privacy level of the requested item. Thus it is determined whether the requestor is permitted to see the personal map item. Step 427 effectively determines whether a second user associated with the request has permission for the privacy level associated with the text. If so, then in step 431, the requested personal map items or items are returned to the requestor, e.g., the application 116. Thus, step 429 includes determining to send the association between the text and the geographic location, if the second user does have permission for the privacy level. If not, then in step 429 the user is requested to add the requestor to a different category of contact, or change the privacy level of the item, or otherwise permit the requestor to receive the requested personal map item If nothing is changed, the requestor is denied the personal map item. Thus, step 429 includes determining not to send the association between the text and the geographic location, if the second user does not have permission for the privacy level. If a change is made to permit the requestor, then the requested personal map item or items are returned to the requestor. IN some embodiments, when seeking another user's personal layer, the UI also provides means to ask for a specific item of the personal layer and at a requested level of privacy. For example, user A might seek only "user B's daughters play school" even though user A may be a friend whose default may be a type C permission. User B, upon seeing the request can grant permission for the same.

Figure 5D:
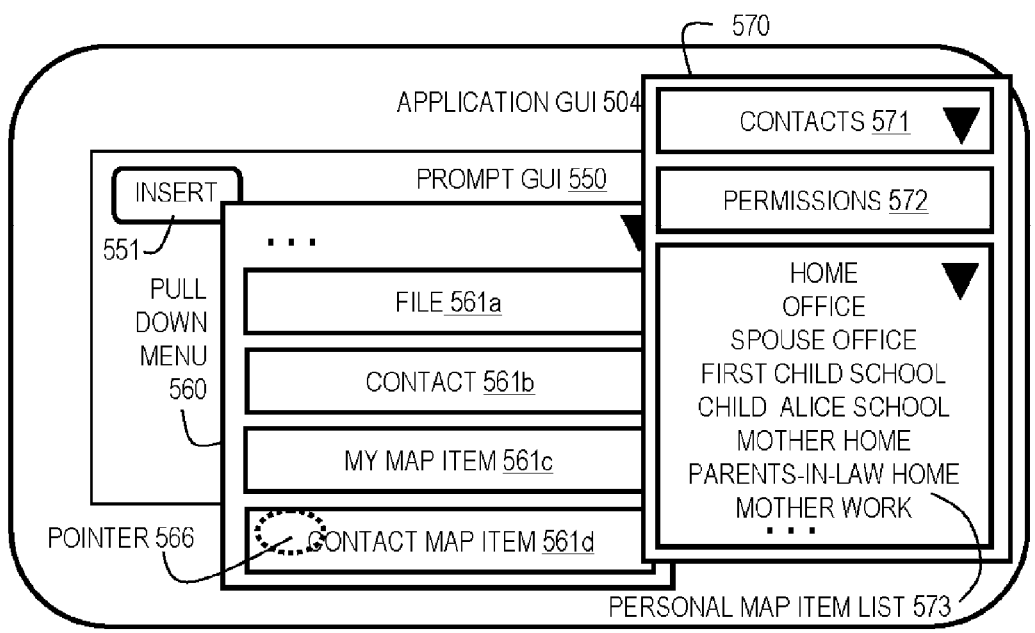

FIG. 5D is a diagram that illustrates an application GUI 504 for retrieving a position by semantic or subjective label, according to an embodiment. For example, it is assumed that the application 116 is a messaging application, such as an electronic mail (email) application. The user of the application is prompted to form a message in prompt GUI 550. The prompt GUI 550 includes an insert active area, such as insert button 551. In response, an insert pull down menu 560 is presented to the user of the application to select the object to be inserted into the message. Many well known objects can be inserted into a message, such as text, pictures, videos, files and contacts—as indicated by ellipsis and file active area 561a and contact active area 561b.

According to some embodiments, personal map items can also be inserted into a message, as indicated by the "my map item" active area 561c and "contact map item" active area 561d. When active area 561c is selected the user of application 116 attempts to insert a personal map items of the user's own PML. When active area 561d is selected, the user of the application 116 attempts to insert a personal map items of the PML of a different user, e.g., from the combined PML 255 from a PML server 250 or from a PML 205 of a different user of the UE 101. In some embodiments the active areas 561c and 561d are presented in the user interface 201 in response to a request sent to the client API 211 by the application 116. Thus active areas 561c and 561d are presented through the client user interface module 201, as described above.

For purposes of illustration it is assumed that active area 561d is selected. In response, the window 570 opens. Window 570 is presented through the client user interface module 201, as described above. In some embodiments the window 570 is presented in the user interface 201 in response to a request sent to the client API 211 by the application 116. The window 570 includes a contacts pull down menu 571, a permissions pull down menu 572, and a personal map item list pull down menu 573. The contacts pull down menu 571 is operated to select a contact whose personal map item is to be inserted.

Once such a contact is inserted, the permissions pull down menu 572 is operated to change a permission level for the contact in case the contact ever requests the requestor's PML. The default or formerly assigned permission level (e.g., friend, level 4) is presented in active area 572. The pull down menu is operated to change the permission level, e.g., to Your Eyes Only (level 1), Immediate Family (level 2), Family (level 3), Contacts (level 5) or Public (level 6). In other embodiments, pull menu 572 is presented in other applications, such as a social networking user interface when a contact is added or edited. It is convenient to depict active area 572 in window 570 to reduce the number of different user interfaces to describe. Similarly, in some embodiments, certain levels of permission are provided for individual items on personal layer while keeping rest of items as default.

Once such a contact is inserted and the requestor's permission to access the items of that contact is determined, the list pull down menu 573 is populated with the labels of the allowed items. One of the labels can then be selected to insert an object that represents that position into the message. For example, if the child Alice school item is selected, an object labeled "child Alice school" is inserted into the message. The object includes the map data associated with the child Alice School in the PML, such as the position or POI or path. It is assumed that "Alice246" was associated with the child using the contacts prompts described above. Because a person may have multiple children, the PDV relationship "child" is modified by the contact information associated with that category. Alternatively, the modifier "Alice" can be inserted as subjective text associated with the PDV term "child." Thus one can distinguish child Alice from child Betty.

In step 433, it is determined whether end conditions are satisfied. If so, the process 400 ends. Otherwise, control passes back to step 403 and following to continue tracking the device locations and context to learn other locations of import.

Figure 6:
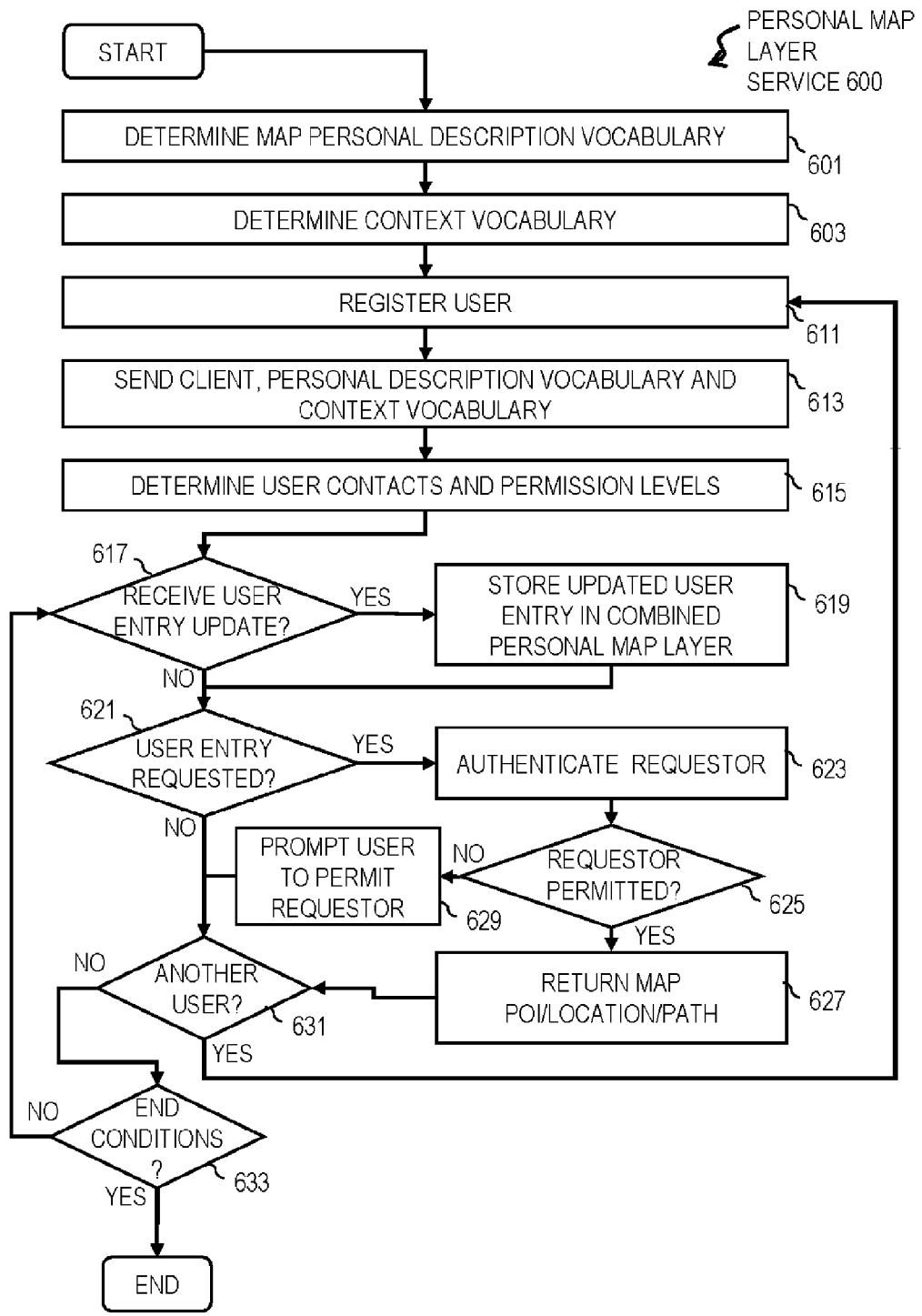
FIG. 6 is a flowchart of a process for a personal map layer service process, according to one embodiment.
Figure 8:
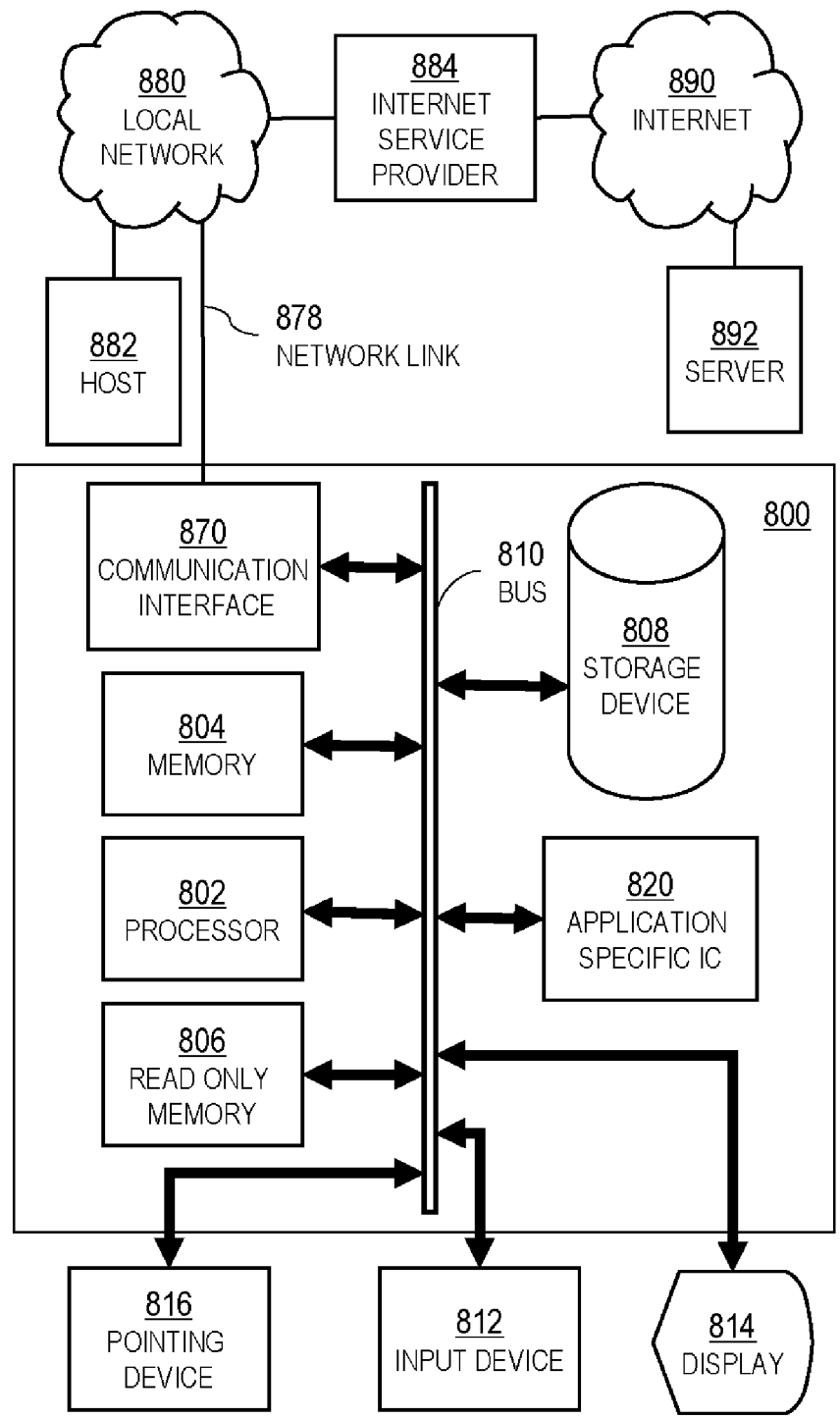
FIG. 8 is a diagram of hardware that can be used to implement an embodiment of the invention.

FIG. 6 is a flowchart of a process 600 for a personal map layer service process, according to one embodiment. In one embodiment, the personal layer access manager 253 of the personal map layer server 250 performs the process 600 and is implemented in, for instance, a chip set including a processor and a memory as shown in FIG. 9 or on general purpose computer as depicted in FIG. 8. In some embodiments, one or more steps or portions thereof are performed by other components of server 250 or other nodes in communication with network 105.

In step 601, the personal description vocabulary (PDV) for map items is determined and stored, e.g., in PDV data structure 209. Any method may be used to determine the PDV. For example, the PDV is based on types of POI, if any, such as school, hospital, etc and the context, such as time and duration of dwell and applications executing, for test subjects while at their corresponding points of interest or non-POI addresses. In some embodiments, values for one or more entries or fields thereof, are determined based on manual input by one or more experts. Thus vocabulary entries 301 are added to a data structure 300.

In step 603, a context vocabulary is determined and stored, e.g., in context vocabulary data structure 217. In various embodiments, a context vocabulary and topology is developed that identifies words and topics related to consumers' contexts. Any method known in the art may be used to generate the context vocabulary and topology. For example, several documents are collected that discuss and describe consumer context, such as documents that describe the significance of whether the consumer is working for pay or performing other duties or at leisure, whether the current time is a weeknight or weekend, whether the current season is summer or winter, whether the consumer is at home or away, or whether the consumer is at a destination or en route, whether a document is invoking a place name or a person name, whether the consumer is stationary or moving and at what speeds and directions, whether it is light or dark, and what applications are available on a user equipment belonging to the consumer. These documents are mined to determine words related to consumer context, collections of words related to context, or relative usage of those words, or some combination. In some embodiments, the vocabulary topology includes topics imposed on or deduced from relative occurrences of words within the documents. For example, in various embodiments, probabilistic latent semantic indexing (pLSI) or latent Dirichlet allocation (LDA), well known in the art, are used to deduce topics from words in a set of documents. Such methods can be used to derive context words and context topics from a set of documents that are directed to the circumstances of consumers of network services. Because each topic is associated with a group of words in certain relative abundances, there is a topology relating topics to words and subtopics to higher level topics. In some embodiments a context vocabulary is built manually or by relying on or extending some standard topology such as Open Directory Project (ODP) vocabulary. In these embodiments, LDA is not used in building the context vocabulary itself; but, once a vocabulary is established, documents can be mined using LDA to see what topics/context is contained within the document. The context vocabulary topology is used in various embodiments described herein to determine context for UE 101 and for map items.

In some embodiments, there are only two levels of categories, e.g., topics and words, below the root level context vocabulary. Each topic is defined by a set of words, each with a particular range of occurrence percentages. In some of these embodiments, a vocabulary of V words is represented by a V-dimensional vector; and each word is represented by a V-dimensional vector with zeros in all positions but the position that corresponds to that particular word. Typically words of low meaning, such as articles, prepositions, pronouns and commonly used words are ignored. Each of T topics is represented by a V-dimensional vector with relative occurrences of each word in the topic represented by a percentage in the corresponding word positions. All topics are represented by a V×T matrix.

When a word from the context vocabulary is found in a document (e.g., a message from a user or a product description, e.g., in field 207), that word is considered a mixture of the different topics that include that word, with a percent probability assigned to each topic based on the percentage of words in the document, for example using the well known methods of LDA. As a result, the entire document can be represented by a set of topics found in the document with a probability metric assigned to each topic, e.g., a T-dimensional vector with varying probabilities in each position of the vector. Such a vector is an example of a context token herein. Two documents (such as a description of a product and a description of the current state of a UE 101) can be compared by computing a similarity of the two T-dimensional vectors (tokens) representing those documents, such as a sum of products of corresponding terms. Alternatively, or in addition, a distance metric can be computed between the two documents, which increases as the two tokens become less similar. Any distance metric can be used, such as an order zero distance (absolute value of the coordinate with the largest difference), an order 1 distance (a sum of the absolute values of the T differences) an order two distance (a sum of the squares of the T differences—equivalent to the Euclidean distance), an order three distance (a sum of cubes of absolute values), etc. The more similar are tokens from two documents, or the smaller the distance between those tokens, the more relevant are the documents to each other. In the following description, it is assumed that a context vocabulary has been defined and is stored in a context vocabulary data structure. The context of a document or resource is represented by a context token. The more similar the context tokens of two documents, e.g., the smaller the distance measure between them, the more relevant one document is to the consumer context indicated by the other document.

Context vocabulary and tokens are not obtained only from mining a user text base but more often directly on context data from the device. Thus, in some embodiments, context vocabulary is defined based on output from the context engine 103, which reflects all context that can be inferred from the device side, e.g., as user location, current activity, transport mode (in car, in bus, driving etc), relations (social contacts), and executing applications (e.g., messaging, audio, video, games, word processor, spreadsheet, etc).

In step 611a user is registered for the personal map layer service. For example, a subscriber to a subscription service 110a, such as a social networking service, selects an icon to add a personal map layer application to the user's device. The user information is sent by the subscription service 110a to the PML server 250 through the server API 257. In another embodiment, a user operates a browser 107 to contact the PML server 150. During step 611 one or more web pages for registering a user are presented to the user of UE 101 through the browser 107. The user is registered, or not, based on those responses.

In step 613, in response to a successful registration, the client process 152, including copies of the PDV data structure 209 and context vocabulary data structure 217 are made available to the client 152, e.g., are sent to and installed on the user's device, e.g., UE 101 as modules 201, 203, 207, 211, 213 and 215 and as PDV data structure 209 and context vocabulary data structure 217. Thus step 613 to provide the client process 152 on the UE 101 is a means for doing any or all steps of the client 200 described above. Thus step 613 includes determining a geographic location indicated by operation of a device (UE 101), and determining text that describes a relationship between the geographic location and a first user of the device (UE 101), and determining a privacy level for the text.

In step 615, the user contacts and permission levels are determined. For example, the user contacts are sent by the subscription service 110a to the PML server 250 through the server API 257. Based on circles of friends in a social network service or responses to active area 572 in window 570 sent by the PML client, the permission level of each contact is determined. In some embodiments a person not listed among the user's contacts is considered a member of the public and is permitted only to see map items with the public privacy level, e.g., level 6.

In step 617, it is determined whether a user entry update is received, e.g., whether a message is received with one or more fields of data structure 321. For example, such a message is sent by the PML client 152 in step 421, described above. If so, then in step 619 the updated entry is stored in the combined personal map layer data structure 255. The updated information either replaces data in one or more fields of a personal map item field 330 already associated with the user who sent the message as indicated in field 323, or is added as a new personal map item field 330. Thus step 617 includes associating the first user of the device (UE 101) with the text and the geographic location and the privacy level in combined PML data structure 255. Step 619 includes determining to store the association of the first user with the text and the geographic location and the privacy level into a common data structure for access by a plurality of user devices.

The above steps 611 through 619 are related to the formation of the combined PML data structure 255 for multiple users. The following steps are related to using the PML in one or more applications, including one or more non-map applications.

In step 621, a request is received for a user entry from the combined PML data structure 255. For example, request message 350, described above, is received. Thus step 621 includes receiving a request for an association between the text and the geographic location for the first user.

If such a request is received, then in step 623 the requesting entity is authenticated. For example, credentials for the requestor are sent to the AAA service 251. In step 625, it is determined whether the requestor is permitted access to the requested personal map items in fields 330 of the user indicated in field 323. For example, it is determined whether the requestor is a contact labeled as the user, the immediate family, family, friend, other contact or not labeled (hence a member of the general public) and the privacy level of the requested item. Thus it is determined whether the requestor is permitted to see the personal map item; e.g., it is determined whether a second user associated with the request has permission for the privacy level associated with the text. If so, then in step 627, the requested personal map items or items are returned to the requestor, e.g., to the application 116. For example, a list of labels to be presented, for example in area 573, is returned if field 355 or field 357 is blank in the request. Alternatively, for example, the map data from field 331 associated with the label specified in the request is returned if field 355 and field 357 hold information indicating the personal label. Thus step 627 includes determining to send the association between the text and the geographic location, if the second user does have permission for the privacy level.

If the requestor is not permitted to access the requested personal map item, then in step 629 the user is requested to add the requestor to a different category of contact (e.g., in active area 572), or change the privacy level of the item (e.g., in active area 535), or otherwise permit the requestor to receive the requested personal map item. If nothing is changed, the requestor is denied the personal map item. Thus, step 629 includes determining not to send the association between the text and the geographic location, if the second user does not have permission for the privacy level. If a change is made to permit the requestor, then the requested personal map item or items are returned to the requestor.

In step 631, it is determined whether another user is to be registered. If so, control passes back to step 611 and following to register that user. In step 633, it is determined whether end conditions are satisfied for ending the PML service, e.g., for maintenance or equipment change. If so, the process ends. Otherwise, control passes back to step 617 and following to process any updates or requests for personal map layer information, as described above.

Figure 7:
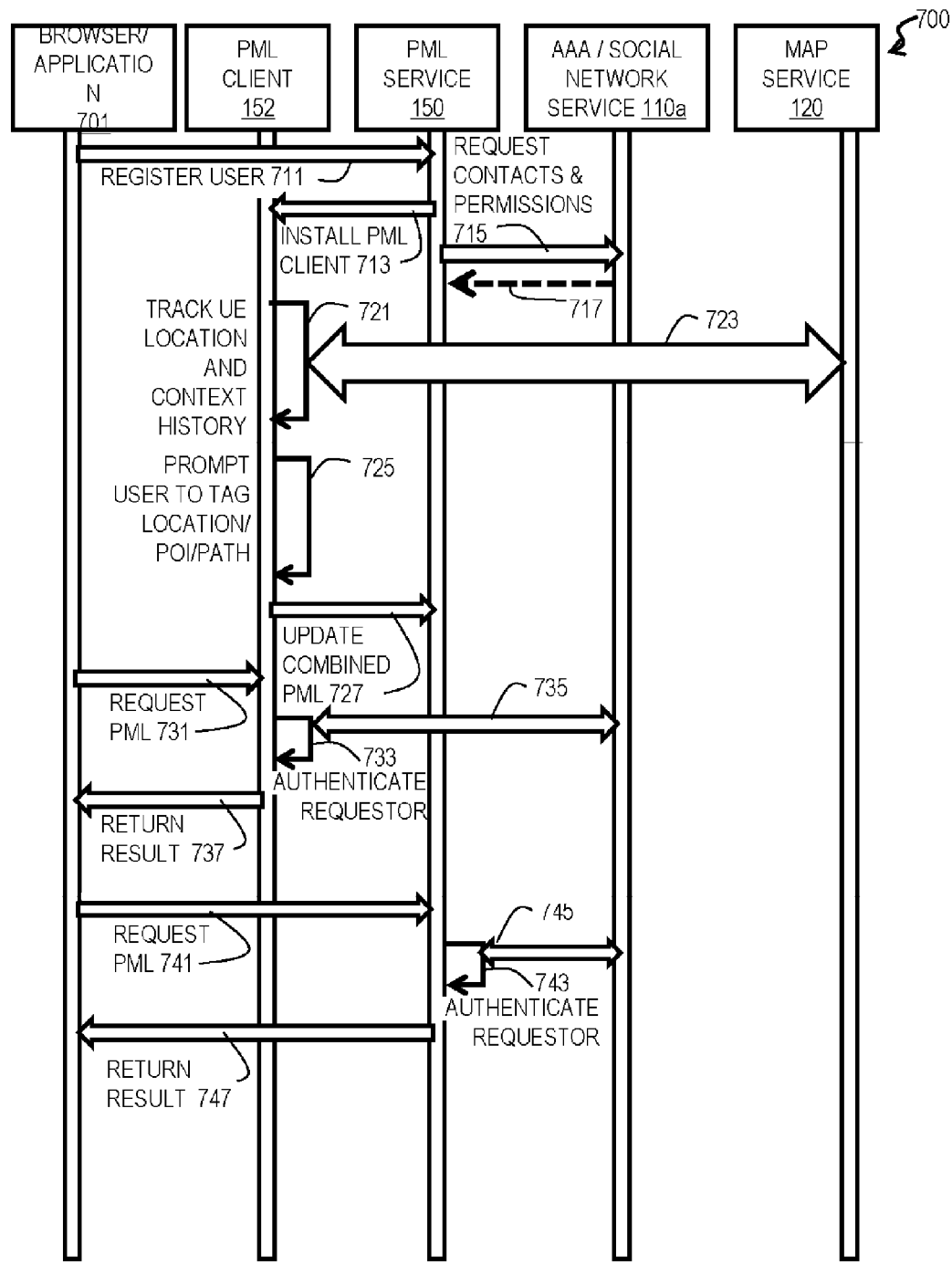
FIG. 7 is a time-sequence diagram showing interactions among processes for a secure shared personal map layer, according to one embodiment.

FIG. 7 is a time-sequence diagram 700 showing interactions among processes for a secure shared personal map layer, according to one embodiment. Time increase downward in this diagram. Each of several interacting processes is represented by a vertical bar labeled by a box at the top of the bar. A message sent from one process to another is depicted as a horizontal arrow from the sending process to the receiving process. A step performed within one process is indicated by an arrow starting and ending on the same bar at a vertical position indicating its temporal sequence. The processes involved in the sequence 700 include process 701 representing some combination of a browser 107 or application 116 on UE 101, or a non-mapping network service 110. The other processes include the PML client 152 (such as client 200), the PML service 150 (such as server 250), an AAA service (such as a social network or other subscription service 110a), and map service 120.

One or more register user messages 711 are sent from the process 701 to the PML service, e.g., in step 611. In some embodiments, the register user messages are sent from the AAA service or a social network service 110a. In response, one or more messages 713 are sent to the UE 101 to install the PML client 152, e.g., in step 613 described above.

In process 721, the PML client 152 tracks the position and context, including dwell times, of the UE 101, e.g., in steps 403 to 409 described above. Map data, such as POI IDs and paths along roads are determined in one or more messages 723 exchanged with the map service 120. In process 725, the user is prompted to tag a map location, POI or path, with a personal tag, e.g., in steps 411 through 419 described above, and update the user's PML data structure, e.g., in step 421. The update is sent in one or more messages 727 to the PML service 150 to update the combined PML, e.g., combined PML data structure 255. This process is described on the client side in step 421 and on the server side in steps 617 and 619.

Subsequently, in some embodiments, one or more request messages 731 are sent from the browser 107 or UE application 116 on UE 101, or from network service 110 or 120, to the PML client 152. In process 733, the requestor is authenticated, e.g., by exchanging one or more authentication messages 735 with AAA service 110a, and a successful or unsuccessful result is sent in one or more return result messages 737. Process 733 is performed, for example, in steps 425 to 431 described above.

Similarly, in some embodiments, one or more request messages 741 are sent from the browser 107 or UE application 116 on UE 101, or from network service 110 or 120, to the PML server 150. In process 743, the requestor is authenticated, e.g., by exchanging one or more authentication messages 745 with AAA service 110a; and a successful or unsuccessful result is sent in one or more return result messages 747. Process 743 is performed, for example, in steps 621 to 629 described above.

The processes described herein for providing a secure shared personal map layer may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide a secure shared personal map layer as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing a secure shared personal map layer.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing a secure shared personal map layer. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing a secure shared personal map layer. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a secure shared personal map layer providing a secure shared personal map layer, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing a secure shared personal map layer to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide a secure shared personal map layer as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing a secure shared personal map layer.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a secure shared personal map layer. The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing a secure shared personal map layer. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a secure shared personal map layer. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a secure shared personal map layer. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

at least one determination of a geographic location as a map item associated at least with operation of a device on a map;

at least one determination of indication that describes a personal relationship between the geographic location and a first user of the device, wherein the personal relationship is derived from one or more characteristics of the geographic location and a visiting history of the first user to the geographic location;

a recommendation of one or more personal description vocabulary labels to the geographic location, wherein the labels describe the personal relationship;

at least one determination of at least one privacy level for the indication; and an association of at least the first user of the device with the indication, the geographic location, one or more of the personal description vocabulary labels selected by the first user, and the at least one privacy level into one personal map layer to be shared with one or more other users, one or more services used by the first user, or a combination thereof.

2. A method of claim 1, wherein the (1) data and/or (2) information and/or (3) at least one signal are further based, at least in part, on the following further comprises:
   at least one determination of a presentation of a prompt that solicits the personal relationship from the first user,
   wherein the association is based at least in part on a response received in response to the presentation of the prompt.

3. A method of claim 1, wherein the visiting history is determined based on at least a time and duration of pausing in a vicinity of the geographic location according to a positioning system co-located with the device.

4. A method of claim 2, wherein (1) data and/or (2) information and/or (3) at least one signal are further based, at least in part, on the following:
   at least one determination of a presentation of the one or more personal description vocabulary labels and a prompt that solicits user selection from the first user; and
   receiving the user selection of at least one of the personal description vocabulary labels.

5. A method of claim 4, wherein the one or more personal description vocabulary labels are further derived from a context for the device, a type of a point of interest associated with the geographic location, or a combination thereof.

6. A method of claim 1, wherein the personal relationship includes a personal relationship between the geographic location and a personal contact of the first user, and the at least one privacy level is associated with at least one circle of contacts in at least one social networking service.

7. A method of claim 1, wherein the (1) data and/or (2) information and/or (3) at least one signal are further based, at least in part, on the following:
   at least one request for the association;
   at least one determination of whether at least a second user associated with the request has permission for the at least one privacy level associated with the personal relationship;
   at least one determination not to send the personal relationship, if the at least second user does not have permission for the at least one privacy level; and
   at least one determination to send the personal relationship, if the at least second user does have permission for the at least one privacy level.

8. A method of claim 4, wherein the (1) data and/or (2) information and/or (3) at least one signal are further based, at least in part, on the following:
   at least one determination to store the personal map layer into at least a common data structure for access by a plurality of user devices; and
   applying the personal map layer in one or more software applications,
   wherein the one or more personal description vocabulary labels include one or more navigation tokens, one or more communication tokens, one or more activity tokens, or a combination thereof.

9. An apparatus comprising:
   at least one processor; and
   at least one memory including computer program code for one or more programs,
   the at least one memory and the computer program code configured to, with the at least one processor, cause the apparatus to perform at least the following,
   determine a geographic location as a map item associated at least with operation of a device on a map;
   determine indication that describes a personal relationship between the geographic location and a first user of the device, wherein the personal relationship is derived from one or more characteristics of the geographic location and a visiting history of the first user to the geographic location;
   recommend one or more personal description vocabulary labels to the geographic location, wherein the labels describe the personal relationship;
   determine at least one privacy level for the indication; and
   associate at least the first user of the device with the indication, the geographic location, one or more of the personal description vocabulary labels selected by the first user, and the at least one privacy level into one personal map layer to be shared with one or more other users, one or more services used by the first user, or a combination thereof.

10. An apparatus of claim 9, wherein the apparatus is embedded in the device.

11. An apparatus of claim 9, wherein determining the personal relationship further causes the apparatus to:
    determine to present a prompt that solicits the personal relationship from the first user,
    wherein the association is based at least in part on a response received in response to the presentation of the prompt.

12. An apparatus of claim 9, wherein visiting history is determined based on at least a time and duration of pausing in a vicinity of the geographic location according to a positioning system co-located with the device.

13. An apparatus of claim 9, wherein determining to present the prompt further causes the apparatus to:
    determine a recommendation of one or more personal description vocabulary labels to the geographic location as the indication, wherein the labels describe the personal relationship;
    present the one or more personal description vocabulary labels and a prompt that solicits user selection from the first user; and
    receive the user selection of at least one of the personal description vocabulary labels.

14. An apparatus of claim 13, wherein the one or more personal description vocabulary labels are further derived from a context for the device, a type of a point of interest associated with the geographic location, or a combination thereof.

15. An apparatus of claim 9, wherein determining the privacy level further causes the apparatus to determine a suggested privacy level based on the geographic location and a context for the device.

16. An apparatus of claim 9, wherein the privacy level is associated with a circle of contacts in a social networking service.

17. An apparatus of claim 9, wherein the apparatus is further caused to:
    receive a request for the association
    determine whether a second user associated with the request has permission for the privacy level associated with the personal relationship;
    determine not to send the personal relationship, if the at least second user does not have permission for the at least one privacy level; and
    determine to send the personal relationship, if the at least second user does have permission for the at least one privacy level.

18. An apparatus of claim 9, wherein the apparatus is further caused to determine to store the association of the first user with the indication and the geographic location and the privacy level into a common data structure for access by a plurality of user devices.

19. An apparatus of claim 9, wherein the device is a mobile phone further comprising:
  user interface circuitry and user interface software configured to facilitate user control of at least some functions of the mobile phone through use of a display and configured to respond to user input; and
  a display and display circuitry configured to display at least a portion of a user interface of the mobile phone, the display and display circuitry configured to facilitate user control of at least some functions of the mobile phone.

* * * * *